US012579843B2

(12) United States Patent　　　　　　(10) Patent No.:　　US 12,579,843 B2
Yao et al.　　　　　　　　　　　　　　(45) Date of Patent:　　　Mar. 17, 2026

(54) METHOD AND SYSTEM OF IMAGE PROCESSING FOR ACTION CLASSIFICATION

(71) Applicant: Intel Corporation, Santa Clara, CA (US)

(72) Inventors: Anbang Yao, Beijing (CN); Shandong Wang, Beijing (CN); Ming Lu, Beijing (CN); Yuqing Hou, Beijing (CN); Yangyuxuan Kang, Beijing (CN); Yurong Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 511 days.

(21) Appl. No.: 18/014,722

(22) PCT Filed: Aug. 14, 2020

(86) PCT No.: PCT/CN2020/109253
　　§ 371 (c)(1),
　　(2) Date: Jan. 5, 2023

(87) PCT Pub. No.: WO2022/032652
　　PCT Pub. Date: Feb. 17, 2022

(65) Prior Publication Data
　　US 2023/0274580 A1　　Aug. 31, 2023

(51) Int. Cl.
　　*G06V 40/20*　　(2022.01)
　　*G06T 7/20*　　(2017.01)
　　*G06V 10/44*　　(2022.01)
　　*G06V 10/82*　　(2022.01)

(52) U.S. Cl.
　　CPC ................ *G06V 40/23* (2022.01); *G06T 7/20* (2013.01); *G06V 10/44* (2022.01); *G06V 10/82* (2022.01); *G06T 2207/20044* (2013.01); *G06T 2207/30196* (2013.01)

(58) Field of Classification Search
　　CPC ........ G06V 40/23; G06V 10/44; G06V 10/82; G06T 7/20; G06T 2207/20044; G06T 2207/30196
　　See application file for complete search history.

(56) References Cited

U.S. PATENT DOCUMENTS

| | | | |
|---|---|---|---|
| 2020/0202119 A1 | 6/2020 | Wang et al. | |
| 2020/0237266 A1 | 7/2020 | Qiao et al. | |

FOREIGN PATENT DOCUMENTS

| | | | | |
|---|---|---|---|---|
| CN | 107122798 | 9/2017 | | |
| CN | 110348364 | 10/2019 | | |
| WO | WO-2017155126 A1 * | 9/2017 | ......... | H04N 21/2343 |
| WO | 2019072243 | 4/2019 | | |
| WO | WO-2021178692 A1 * | 9/2021 | ......... | A63B 24/0006 |

(Continued)

OTHER PUBLICATIONS

International Search Report and Written Opinion for PCT Application No. PCT/CN2020/109253, dated May 11, 2021.

(Continued)

*Primary Examiner* — Shefali D Goradia
(74) *Attorney, Agent, or Firm* — Hanley, Flight & Zimmerman, LLC

(57)　　　　　　ABSTRACT

A method and system of image processing for action classification uses fine-grained motion-attributes.

22 Claims, 9 Drawing Sheets

(56)  References Cited

FOREIGN PATENT DOCUMENTS

WO    WO-2022026886 A1 *  2/2022  ........... A61B 5/0077

OTHER PUBLICATIONS

Feichtenhofer, C., et al., "Convolutional Two-Stream Network Fusion for Video Action Recognition", arXiv:1604.06573v2; (CVPR 2016).

Feichtenhofer, C., et al., "SlowFast Networks for Video Recognition", arXiv:1812.03982v3; (ICCV2019).

Hochreiter, S., et al., "Long Short-term Memory", Neural Computation 9(8), 1735-80; Dec. 1997.

Kay, W., et al., "The kinetics human action video dataset", arXiv:1705.06950v1; 2017.

Kuehne, H., et al., "Hmdb: a large video database for human motion recognition", ICCV (2011).

Li, D., et al., "HBONet: Harmonious Bottleneck on Two Orthogonal Dimensions", arXiv:1908.03888v1; ICCV 2019.

Liu, S., et al., "FSD-10: A Dataset for Competitive Sports Content Analysis Analysis", arXiv:2002.00312v1; IEEE 2020.

Parmar, P., et al., "Action quality assessment across multiple actions", arXiv:1812.06367v2; WACV 2019.

Pirsiavash, H., et al., "Assessing the quality of actions", ECCV 2014.

Qiu, Z., et al., "Learning Spatio-Temporal Representation with Pseudo-3D Residual Networks", arXiv:1711.10305v1; (ICCV 2017).

Simonyan, K., et al., "Two-Stream Convolutional Networks for Action Recognition in Videos", arXiv:1406.2199v2; (NIPS 2014).

Soomro, K., et al., "Ucf101: A dataset of 101 human actions classes from videos in the wild", arXiv:1212.0402v1; 2012.

Tran, D., et al., "Learning Spatiotemporal Features with 3D Convolutional Networks", arXiv:1412.0767v4, Oct. 7, 2015; (ICCV 2015).

Wang, L., et al., "Temporal Segment Networks: Towards Good Practices for Deep Action Recognition", arXiv:1608.00859v1; (ECCV 2018).

Wang, X., et al., "Non-local neural networks", arXiv:1711.07971v3; (CVPR 2018).

Williams, R., et al., "Simple statistical gradient-following algorithms for connectionist reinforcement learning", Machine Learning, 8 (3-4): 229-256, 1992.

Yan, S., et al., "Spatial temporal graph convolutional networks for skeleton-based action recognition", arXiv:1801.07455v2; (AAAI 2018).

Zolfaghari, M. , et al., "ECO: efficient convolutional network for online video understanding", arXiv:1804.09066v2; (ECCV 2018).

International Preliminary Report on Patentability for PCT Patent Application No. PCT/CN2020/109253, dated Feb. 23, 2023.

* cited by examiner

Figure 2:
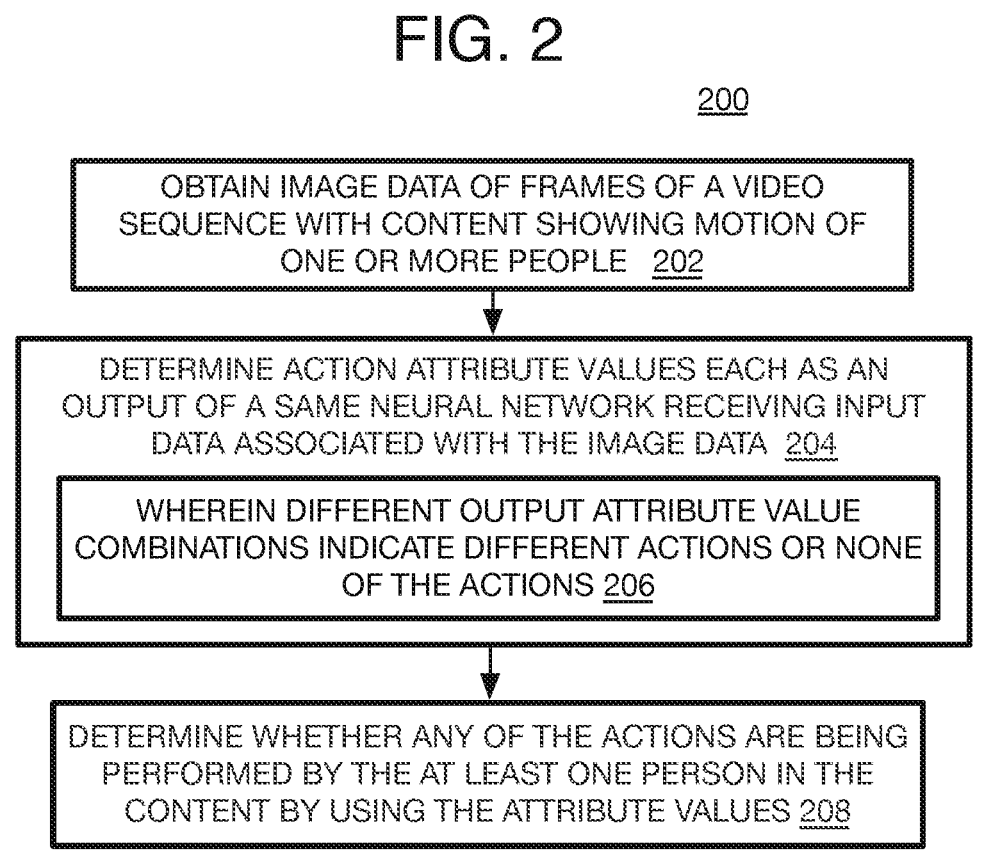

OBTAIN IMAGE DATA OF FRAMES OF A VIDEO
SEQUENCE WITH CONTENT SHOWING MOTION OF
ONE OR MORE PEOPLE   <u>202</u>

DETERMINE ACTION ATTRIBUTE VALUES EACH AS AN
OUTPUT OF A SAME NEURAL NETWORK RECEIVING INPUT
DATA ASSOCIATED WITH THE IMAGE DATA  <u>204</u>

WHEREIN DIFFERENT OUTPUT ATTRIBUTE VALUE
COMBINATIONS INDICATE DIFFERENT ACTIONS OR NONE
OF THE ACTIONS <u>206</u>

DETERMINE WHETHER ANY OF THE ACTIONS ARE BEING
PERFORMED BY THE AT LEAST ONE PERSON IN THE
CONTENT BY USING THE ATTRIBUTE VALUES <u>208</u>

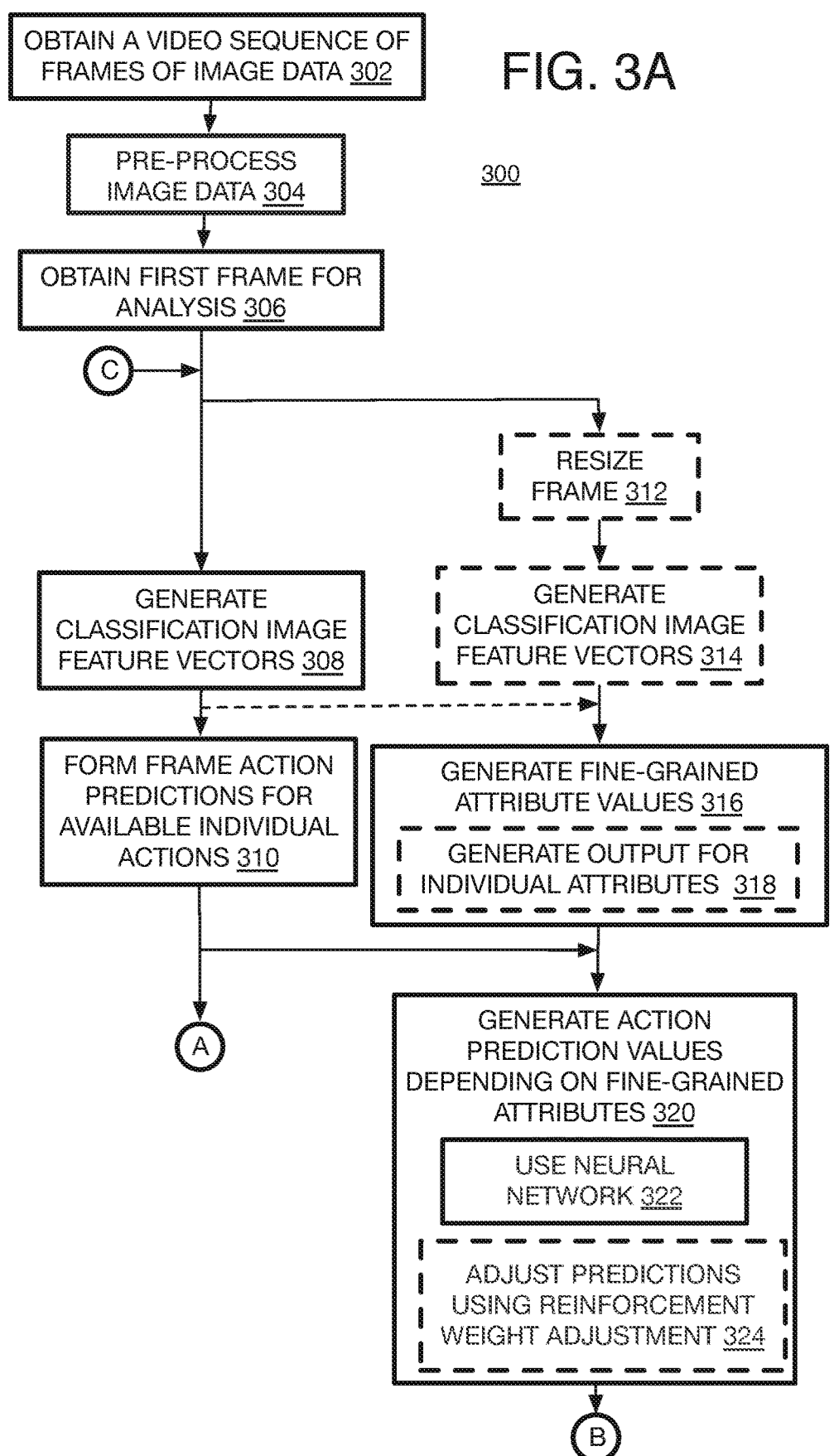

OBTAIN A VIDEO SEQUENCE OF FRAMES OF IMAGE DATA 302

PRE-PROCESS IMAGE DATA 304

OBTAIN FIRST FRAME FOR ANALYSIS 306

C

RESIZE FRAME 312

GENERATE CLASSIFICATION IMAGE FEATURE VECTORS 308

GENERATE CLASSIFICATION IMAGE FEATURE VECTORS 314

FORM FRAME ACTION PREDICTIONS FOR AVAILABLE INDIVIDUAL ACTIONS 310

GENERATE FINE-GRAINED ATTRIBUTE VALUES 316

GENERATE OUTPUT FOR INDIVIDUAL ATTRIBUTES 318

A

GENERATE ACTION PREDICTION VALUES DEPENDING ON FINE-GRAINED ATTRIBUTES 320

USE NEURAL NETWORK 322

ADJUST PREDICTIONS USING REINFORCEMENT WEIGHT ADJUSTMENT 324

B

FIG. 6     <u>600</u>
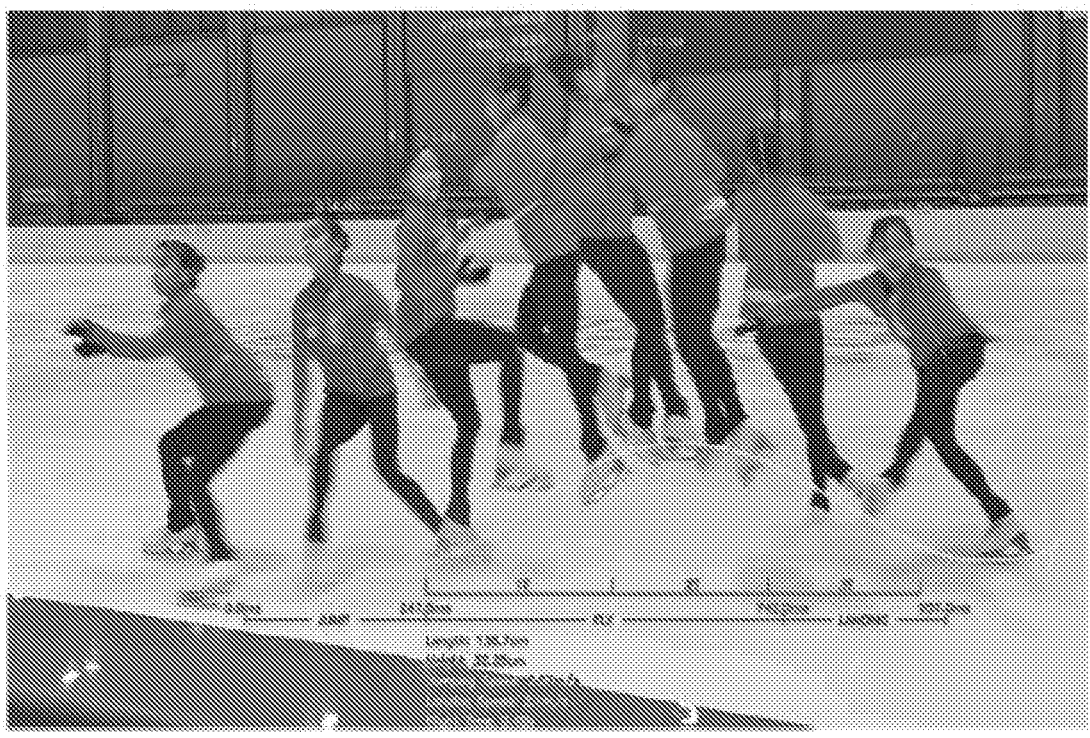
FIG. 7     <u>700</u>
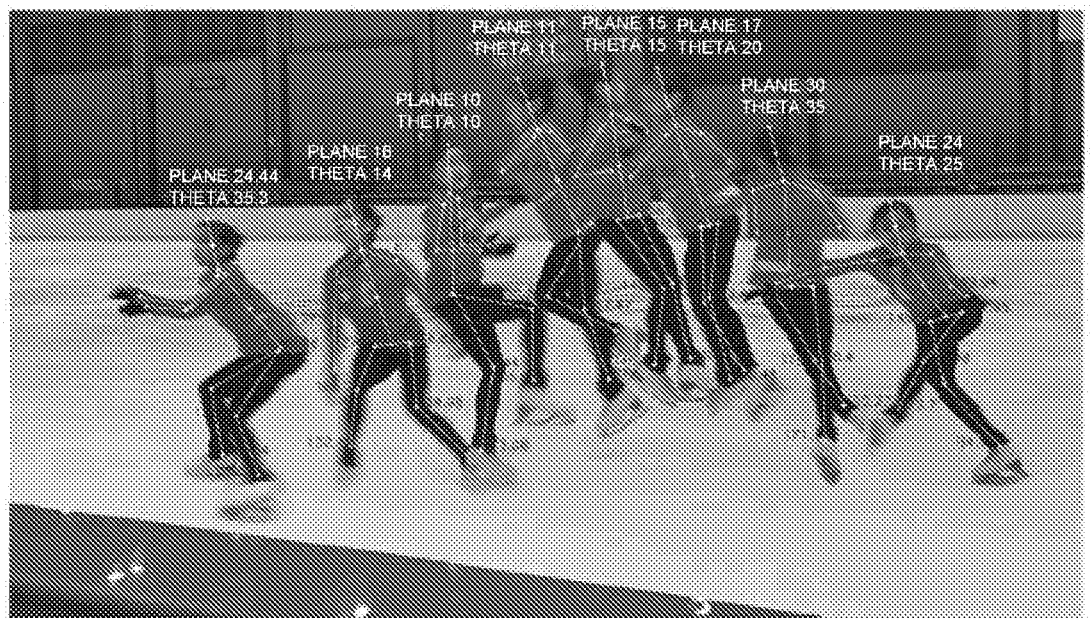

METHOD AND SYSTEM OF IMAGE PROCESSING FOR ACTION CLASSIFICATION

CLAIM OF PRIORITY

This Application is a National Stage Entry of, and claims priority to PCT Application No. PCT/CN2020/109253, filed on 14 Aug. 2020 and titled "METHOD AND SYSTEM OF IMAGE PROCESSING FOR ACTION CLASSIFICA-TION", which is incorporated by reference in its entirety for all purposes.

BACKGROUND

Athletic events and training are often recorded by one or more cameras either to assist with the training or to show images of the event on a display screen. During training, images of one or more athletes can be recorded in order to analyze the athlete's actions or motions. During or after an athletic event, desired video clips or segments may be retrieved to show highlights or particular action of the athlete for viewing, review, comment, and/or analysis of the athlete's motion. To provide the desired video segments of sought-after athletic action, the video of an athletic event or training often needs to be searched for the desired segment and then indexed for future use. This may be performed manually by a user fast-forwarding through a video, for example, to seek the desired video segment and index the point in the video of the action, which is tedious and time consuming. Otherwise, automatic image processing systems can perform such searching and indexing but are often inadequate when the sport has a large variation of fast motion to be indexed and analyzed, such as figure skating jumps for example. In these cases, the existing automatic systems based on conventional action classification and/or recognition techniques are very complex, relatively inaccurate, and inefficient for indexing fast, large variations of athletic motion of the human body in videos.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 2 is a flow chart of a method of image processing with action classification according to at least one of the implementations herein;

FIGS. 3A-3B is a detailed flow chart of a method of image processing with action classification according to at least one of the implementations herein;

FIG. 6 is an image showing an athlete in motion with attribute key points and attribute analysis overlaying the image according to at least one of the implementations herein;

FIG. 7 is the same image as in FIG. 6 showing different attributes overlaying the image according to at least one of the implementations herein;

DETAILED DESCRIPTION

Figure 1:
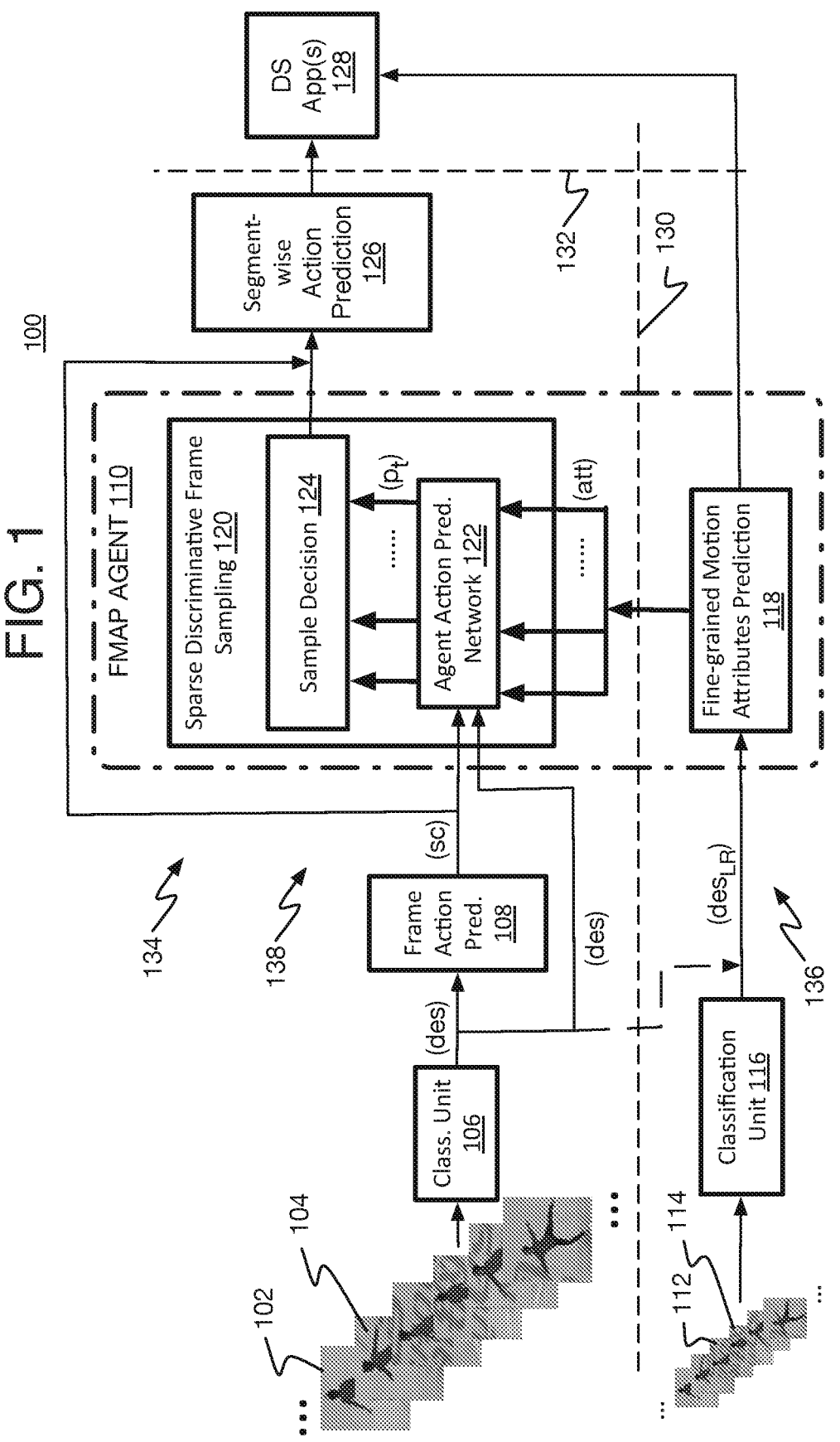
FIG. 1 is a schematic diagram of an image processing system for action classification according to at least one of the implementations herein.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein also may be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices, professional electronic devices such as one or more commercial television cameras, video cameras, or camera arrays that are disposed to record motion of an event or otherwise one or more people in motion by the cameras, and/or consumer electronic (CE) devices such as imaging devices, digital cameras, smart phones, webcams, video cameras, video game panels or consoles, televisions, set top boxes, and so forth, may implement the techniques and/or arrangements described herein, and whether a single camera or multi-camera system. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein also may be implemented as instructions stored on at least one machine-readable or computer-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer or machine readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods of image processing for action classification is provided herein.

Conventional automatic action recognition and/or classification systems have great difficulty with tracking and indexing large variations of fast motion of athletes, such as with figure skating. For example, it is often desirable to analyze figure skating such as jumps as well as transitions between the jumps. There are about 40 or more different jumps alone counting single, double, triple, and quad turn jumps.

A number of the conventional action recognition systems use deep neural networks (DNNs). For example, single stream solutions represent spatial temporal information via computationally intensive 3D convolutional networks where the third dimension is color channel and a fourth dimension is time where the kernel (or filter) itself has a time dimension so that temporal information is preserved.

Other two-stream solutions have one stream for input image data and another stream for input optical flow that uses displacement values from the motion of objects from frame to frame as the input to a neural network. The output score of each stream is then combined or fused to form a single score. Other systems combine elements of both the single and two-stream solutions.

These existing systems typically and mostly consider conventional action recognition problems in which datasets are created for human computer interaction and video analysis applications. Specifically, the neural networks provide datasets merely to recognize coarse classifications that differentiates among basic human actions such as riding a horse, walking, playing a certain sport (e.g., playing tennis versus basketball or golf), eating, drinking, brushing hair, and so forth. These coarse classes have extremely different motions making it much easier to differentiate among them in contrast to fine classes of very similar actions within a same sport for example (number of turns or position of a leg during a figure skating jump to identify the class of jump for example). These systems are trained with images of the different coarse actions but do not have the sophistication and processing power to make distinctions among fast motion, especially that is very similar but are very short (in duration) and have very small differences in pose from frame to frame for example.

As for conventional sports action recognition, most existing action recognition systems and datasets still usually only consider coarse classification of different sports actions. Some systems do track athlete joint positions from frame to frame to assess an Olympic score and project or demonstrate a pose of the athlete for a better score. One system specifically analyzing figure skating can identify ten different actions. All of these neural networks, however, still output an action score indicating a specific action based on image data input to the neural network so that it is still a coarse classification resulting in relatively low accuracy and efficiency that cannot be used for high performance requirements such as for athletic action recognition.

To resolve the issues mentioned above, the disclosed action classification system and method uses a fine-grained motion-attributes-aware policy (FMAP) agent (or FmapAgent) that performs (1) generating fine-grained motion-attribute values (or action attribute values) that represent domain-specific knowledge (where a domain is a specific sport for example) and that can provide a very high level of accuracy, and (2) sparse discriminative, content-aware frame sampling that detects which frames are relevant to actions to be analyzed and only include those detected relevant frames in further action-related recognition or processing to significantly increase efficiency as well as increase accuracy since processing can concentrate on the relevant frames which provides less variable input data, for further action recognition for example. The action attribute values are used to perform the detecting of relevant frames (or in other words, frames that are closely related to an action and are discriminative from frames that are not relevant or related to an action). Deep reinforcement learning also may be used to refine weights during training of the FMAP neural networks (e.g. the sampling or discriminative network) that further increase the accuracy of the neural networks.

More specifically as to the generation of fine-grain attributes, a domain such as a sport may have commonly performed actions referred to herein as coarse classifications. These actions may be formed of motion (or action) attributes referred to herein as fine-grained classifications. For example, the sport of figure skating typically has a skater perform a routine that can be broken down into coarse classifications or actions such as jump elements and transitions between the jumps. Jump elements may include jumps such as toe loop, flip, Lutz, Salchow, loop, axle, and Euler (or half loop) with single to quadruple revolutions depending on the jump, while transitions may include walley jump, falling leaf jump, flick jump, lying sit spin, and so forth. While officially a jump may be divided into eight parts by the sport (setup, load, transition, pivot, takeoff, flight, landing, and exit), what is of interest here is the visible part that forms the jump. Thus, for the indexing and action analysis purposes herein, each jump (or transition) may include a number of visible fine-grained motion or action attributes such as stepping, jumping (takeoff), spinning (pivot), flying (flight), and landing. In addition to these identifiable parts of a jump, other fine-grained action attributes that characterize the motion of the athlete's body are also included to detect or recognize the action such as landing direction, body pose, key body angles, time of flight or total jump time, height, length, trajectory, and so forth during the span of the jump.

The attributes generally form three groups: (1) key point locations (such as a point position of a toe, hip, or shoulder for example) usually relative to another point on the body or a reference line or point, (2) body angles which are measurements of the angle between limbs (between two legs for example), limb parts (between a thigh and the shin for example), a limb and another part of the body (between the leg and the torso for example), or relative to a reference line (between a head and a vertical reference line for example), and (3) speed of the motion from frame to frame or along a segment of frames. Some of these attributes are shown as annotations on FIGS. 4-7 as some examples and are described in further detail below.

The FMAP agent used herein has an extremely fast regression neural network that receives a form of the image data, such as feature vectors from a classification neural network, and outputs fine-grained action attribute predictions or values. One output may be provided for each attribute being tracked, and each attribute can be used to measure many different actions. The regression model or neural network is trained to recognize and provide an attribute value that represents or indicates one of a possible range of values for that attribute. The attribute values are not necessarily the measurement amount of the attribute and may not be understandable to a person. These may be regressed real values but not necessarily binary values. Thus, a range of 0 to 180 degrees for possible measurement amount of an angle attribute may be values of 0 to 1, or some other range determined by training and output from the regression model for this attribute as one possible example. An attribute vector forming the output from the regression neural network (or regression model) then can represent or indicate a certain action or no action. These values may be provided directly to end applications that use the values to recognize the action in a video sequence and to analyze the action. Otherwise, the FMAP agent then uses the output attribute values to detect if a frame is sufficiently relevant to one of the actions. Thereafter, only those frames (or samples) found to be sufficiently relevant (or discriminative) are used for further action recognition or action-based processing.

It was also observed that many sports have bursts of quick action that are of great interest between time periods of irrelevant motion, whether for training or during an athletic event. In figure skating for example, the important athlete actions such as the jumps may occur sparsely across a whole video of a figure skater doing a routine. Thus, different frames have different levels of relevance (either relevant (or discriminative) or irrelevant) with regard to recognizing different figure skating actions. Thus, action recognition could be performed by using just the relevant frames rather than all of the frames of a video sequence thereby reducing processing time and power as well as the total bit cost needed for action recognition, resulting in a significant increase in efficiency. It can also increase accuracy since the input for a subsequent analysis has a dataset that is more related to the desired output (less outliers). Thus, instead of using all frames, equal (uniform) sampling, or random sampling, here sparse discriminative frame sampling is used to identify relevant frames for action recognition, such as figure skating action recognition. The selection of the relevant frames at least partly depends on the fine-grained motion attribute values as extra neural network supervision training signals for an agent neural network as explained below.

Referring to FIG. 1, an image processing system or device 100 performs at least one of the action classification processes disclosed herein. Those components to the left of dividing line 132 may be considered part of an action classification module 134 while those components to the right of the dividing line 132 may be considered separate downstream apps or modules 128 (including a final action recognition application) that use the data from the action classification module. Similarly, those components below the dividing line 130 may be considered part of a fine-grained motion attributes prediction module 136 of the action classification module 134, while those components above the dividing line 130 may be considered part of a sparse discriminative frame sampling module 138.

In more detail, the system 100 receives a video sequence 102 with frames 104 of image data with content of action, or more specifically at least one moving object such as at least one person. By one form, the content is an athlete performing a sport such as a figure skater performing a routine with jumps and transitions between the jumps, and whether the action is for an athletic event, practice, or training of the athlete. The image data is provided to a first classification unit 106 that uses a classification neural network, or other algorithm, to provide representations of the images such as feature vectors (des) that can be further analyzed by other algorithms. A frame action prediction unit 108 may use the feature vectors as inputs to an algorithm to generate initial action scores (sc) that provide a score (or probability) for each action being analyzed. The algorithm may be a neural network as well. The feature vectors (des) as well as the initial scores (sc) may be provided to a fine-grained motion-attributes-aware policy agent (FMAP Agent or FmapAgent) 110.

A video sequence 112, that is the same as video sequence 102 except that it is converted to a lower resolution for efficiency, is provided to a second classification unit 116 (or the same first classification unit 106) to generate lower resolution feature vectors $des_{LR}$. These low resolution feature vectors are then provided to the FMAP agent as well in order to form attribute values (att). By one alternative, the higher resolution feature vectors (des) from the classification unit 106 are also used to form attribute values (att) rather than using a low resolution version of the image data and feature vectors.

The FMAP agent 110 uses the initial scores (sc), the feature vectors (des), and attribute values (att) to generate highly accurate probabilities of each available action being analyzed. These probabilities can be used directly by downstream applications 128, or can be used to determine which frames 104 are relevant to an action. Those frames that are not relevant (not discriminative) are dropped. Thereafter, only those frames with relevance are used by downstream applications to perform highly efficient, final action recognition for example.

To accomplish these tasks, the FMAP agent has a fine-grained motion attributes prediction unit 118 to convert the feature vectors (and by one form, the low resolution feature vectors $des_{LR}$) into attribute values that represent a measurement of a specific attribute. By one form, the attribute values are each or individually an output of a regression model or attribute prediction neural network. These attribute values (or a vector of the attribute values (att)) are provided to a sparse discriminate frame sampling unit 120 with an agent action prediction network unit (or agent network) 122. The agent network 122 receives the feature vectors (des) and the initial scores (sc) as well as the attribute values (att) to generate a vector of the action probabilities (pt), where each output value indicates a likelihood of a specific action. When the probabilities are used to select frames for further processing, a sample decision unit 124 is used to evaluate each of the probabilities. If none of the probabilities meet one or more criterion, such as a threshold, then no action is found and the frame is dropped. When a highest probability passes a criterion, that probability may be passed on as identifying the action in the content of the frame, such as a particular figure skating jump.

A segment-wise action prediction unit 126 then may be used to provide a combined prediction score over a certain number of frames forming the segment, and which are only the selected frames. This may be the entire video sequence or some short part of it. By one form, the combined score is an average over a certain number of frames. By one form, all scores are averaged for all actions and provided to downstream applications, and by another form, only the score of the action with the highest probability is averaged and provided to downstream applications. The probabilities also could be provided and represented by segment as well. The operation of these components of the image processing system 100 are described below.

Referring to FIG. 2, an example process 200 is a computer-implemented method of image processing for action classification. In the illustrated implementation, process 200 may include one or more operations, functions or actions as illustrated by one or more of operations 202 to 208 numbered evenly. By way of non-limiting example, process 200 may be described herein with reference to example image processing systems 100 and 800 of FIGS. 1 and 8 respectively, and where relevant.

Process 200 may include "obtain image data of frames of a video sequence with content showing motion of one or more people" 202. This may include the capturing of an athletic event or one or more athletes during a practice or training. At least one video sequence should show content of the athlete in motion during actions that may be tracked, indexed, and/or analyzed for entertainment, review, rating, training, and so forth as described herein. By one example mentioned, a figure skater may perform jumps that are to be tracked, indexed, and analyzed.

Process 200 may include "determine action attribute values each as an output of a same neural network receiving input data associated with the image data" 204. This may involve providing a regression model such as a neural network where the input data may be feature vectors that are a reduced resolution representation of the image data. The feature vectors may be provided from a classification neural network. By one form, the image data used to form the feature vectors may be converted to a lower resolution to reduce processing time and computational load, thereby increasing efficiency.

Process 200 may include "wherein different output attribute value combinations indicate different actions or none of the actions" 206. The attribute values each represent an attribute measurement. Thus, if an attribute is an angle between body parts or locations on the athlete's body, the attribute output may be a value that represents that measurement along a scale of possible values. Likewise, the output attribute value may be a location (such as a keypoint location) or a speed of a point's motion over one or more frames. It follows that each unique combination of attribute values in an output attribute vector of the attribute values from the regression model may indicate presence of a different action or no action. These attribute values will usually be used for further computer algorithms, such as neural networks, so that the attribute values themselves may or may not be understandable to people.

Process 200 may include "determine whether any of the actions are being performed by the at least one person in the content by using the attribute values" 208. Separately, feature vectors are formed with image data at the provided or high resolution with a classification neural network. This provides initial scores or predictions of the actions (such as one score per action). The attributes, feature vectors, and initial scores may be provided as inputs to an agent action prediction network (or just agent network) that provides very accurate probabilities for the actions. Those frames with probabilities that meet a criteria are considered relevant to an action. Those frames with probabilities that do not meet a criteria are concluded to have no action (or not a sufficient amount of action) and are dropped. Only those frames with sufficient relevancy (or sufficiently discriminative) are used for further action recognition algorithms provided by the downstream applications. In this case, the initial scores of the relevant frames are provided as the final frame probabilities from the action classification module. The initial scores, or a single highest score of multiple frames, may be combined into a single representative score for a segment of frames showing an action where the scores are combined by using an average or other combination. The probabilities from the agent network also may be combined and provided this way as well.

Figure 3B:
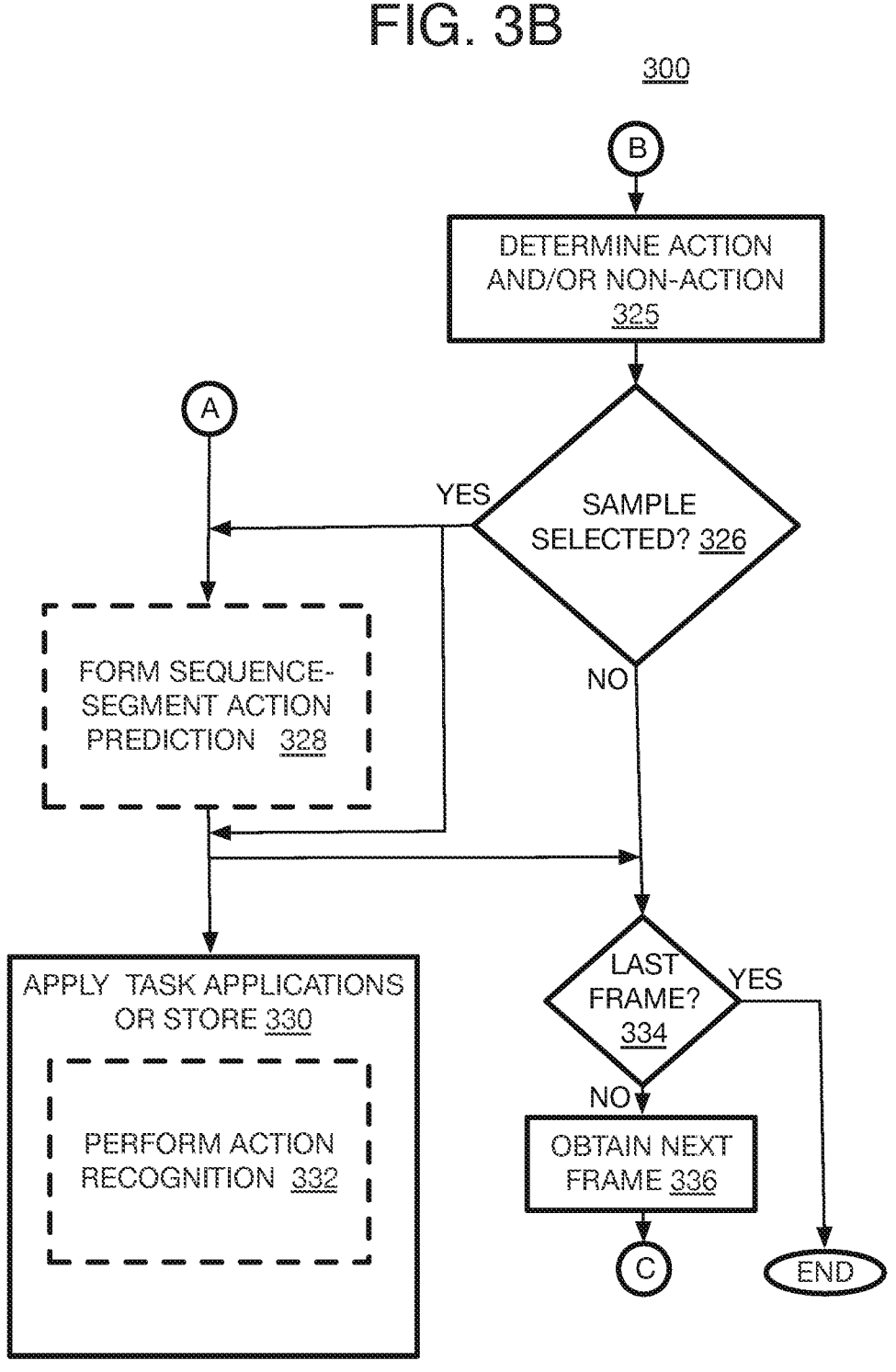

Referring now to FIGS. 3A-3B, by one approach an example process 300 is a computer-implemented method of image processing for action classification. In the illustrated implementation, process 300 may include one or more operations, functions or actions as illustrated by one or more of operations 302 to 336 generally numbered evenly. By way of non-limiting example, process 300 may be described herein with reference to example image processing systems 100 and 800 of FIGS. 1 and 8 respectively, and where relevant.

Process 300 may include "obtain a video sequence of frames of image data" 302, and this is as described above with process 200 at operation 202. The video sequence provided could be a combination of images from different camera perspectives, or could be a 3D space or 3D perspective images form combining images from multiple cameras and so forth. Also, the activity is not limited to sports, and within sports, is not limited to just figure skating. Any activity with distinct actions that can be broken down to the same measureable fine-grained motion attributes may be recorded and analyzed. Diving and gymnastics as well as other sports could be measured in this way.

Process 300 may include "pre-process image data", 304, and here the images are pre-processed if not performed already, and at least sufficiently for the action classification operations described herein. This may include any decoding, demosaicing, color correction, de-noising, and so forth.

Process 300 may include "obtain first frame for analysis", 306, and this may include obtaining the image data of the first frame. It will be understood, by one form, separate preliminary person or object detection may be used when desired, and such detection may or may not be by another neural network (not shown). In such cases, regions of interests (ROIs or bounding boxes) may be found of the athlete for example, and then the images may be cropped to these ROIs so that only the ROIs are analyzed rather than the entire frame. The ROIs may be resized such as all frame ROIs being made the same size. By one form, the neural networks of the frame action prediction unit and FMAP agent automatically perform such tasks as part of the attribute-based action classification process as described below.

Process 300 may include "generate classification image feature vectors" 308. The classification neural network unit 106 may use any neural network to form feature vectors (des). By one example, a lightweight version of HBONet may be used as disclosed by Yao, et al., HBONet: Harmonious Bottleneck on Two Orthogonal Dimensions, ICCV (2019). Specifically, HBONet (0.8) with only about two million multiply-adds may be used by pre-training on ImageNet. The classification unit 106 outputs feature vectors, such as one per frame, and that characterizes the image data of the frame. By one form, these may be semantic feature vectors that are outputted from the last convolutional or fully connected layer Process 300 may include "form frame action predictions for available individual actions", 310. Here, the feature vectors (des) may be provided to a frame action prediction unit 108 that outputs a vector (sc) of probability scores for each frame with one probability score for each possible action being tracked. This neural network may be any kind of existing convolutional neural networks, we use our HBONet (0.8) as an example. By one example, let $F_{clf}$ be a pre-trained model for figure skating sports action recognition that forms the frame action prediction unit, and which can predict frame-wise action classification score vectors (sc). The neural network is trained by using a given target figure skating dataset D (X, Y), where X denotes the training data (in vector form) including N video sequences which have the same length of T frames. Each action to be tracked and analyzed (such as each different type of jump in figure skating) have the same or different number of N video sequences. Y denotes a set of semantic annotations or labels. Thus, Y is a vector of values or index numbers that each indicate a different action such as a different type of jump in figure skating.

By this example, a single video sequence (or segment) may be designated as $x=\{x_1, x_2, \ldots, x_T\}$, where T=8, 16, or 32 for example, the sequence of the corresponding feature vectors are designated as $des=\{des_1, des_2, \ldots, des_T\}$, and the sequence of the corresponding prediction score vectors may be designated as $sc=\{sc_1, sc_2, \ldots, sc_T\}$. Note both $des=\{des_1, des_2, \ldots, des_T\}$ and $sc=\{sc_1, sc_2, \ldots, sc_T\}$ are obtained from the pre-trained model $F_{clf}$. Specifically, $sc=\{sc_1, sc_2, \ldots, sc_T\}$ is calculated as the logit output (or in other words, probability logit $(p)=\log(p/(1-p))$ of $F_{clf}$ while $des=\{des_1, des_2, \ldots, des_T\}$ is extracted from the last feature layer of $F_{clf}$.

Process 300 may include "resize frame", 312. It has been found that separate generation of attribute values does not require such high precision with color and brightness as that provided to the frame action prediction unit 108 since the attributes are mainly used to identify samples as described herein, rather than determining the action scores themselves. Thus, the image data may be converted into lower resolution image data for attribute value generation to increase efficiency of the system 100. A conversion unit (not shown) may perform such resizing to form video sequence 112 with frames 114 of image data of lower resolution, for example, and such lower resolution that is half the resolution of the image data used for the frame action prediction scores by one example.

Process 300 may include "generate classification image feature vectors", 314, and here, the classification unit 116 receives the lower resolution image data 112 to generate feature vectors ($des_{LR}$). Alternatively, it will be understood that the resizing could be omitted and classification unit 116 could provide the image data for attribute value generation as well.

Process 300 may include "generate fine-grained attribute values", 316. Here, the feature vectors from the classification unit 116 (or 106) are provided to the fine-grained motion attributes prediction unit 118 of the FMAP agent 110, and which has a neural network trained to output at least one, but here a vector (att) of attribute values.

As mentioned, the attributes may be for any activity or any sport with at least one attribute, but will usually use multiple measurable attributes, where the same attributes can be used to measure different actions. Often the actions have very fast motion and vary in the direction or speed of these motions from action to action. Thus, for figure skating, the actions are different jumps. Also, as mentioned above, during a single jump or transition, the athlete usually shows extremely fast motion variations in attributes such as stepping, jumping, spinning, flying, landing direction, body pose, key body joint angles, time, height, length, trajectory, and so forth during the span of the jump. These same attribute measurements can be used for many different types of jumps (toe loop, flip, Lutz, Salchow, etc.) or transitions (Walley jump, flick jump, etc.). These are considered the fine-grained motion attributes for figure skating. By one specific example used for the experimentation described below, the attributes include four motion attributes including jumping speed, jumping height, landing speed, and rolling speed, as well as 11 human pose related attributes including 11 different joint angles (6 on arms or shoulders, 4 on legs, and 1 on the head), as illustrated in FIGS. 4-7 below) and relative to the pelvis joint, for a total of 15 attributes being measured. Single key point attribute could be used as well. More or less attributes may be used, and it will be understood that many activities and sports may have actions that can be broken down (or sub-classified) in this way.

Figure 4:
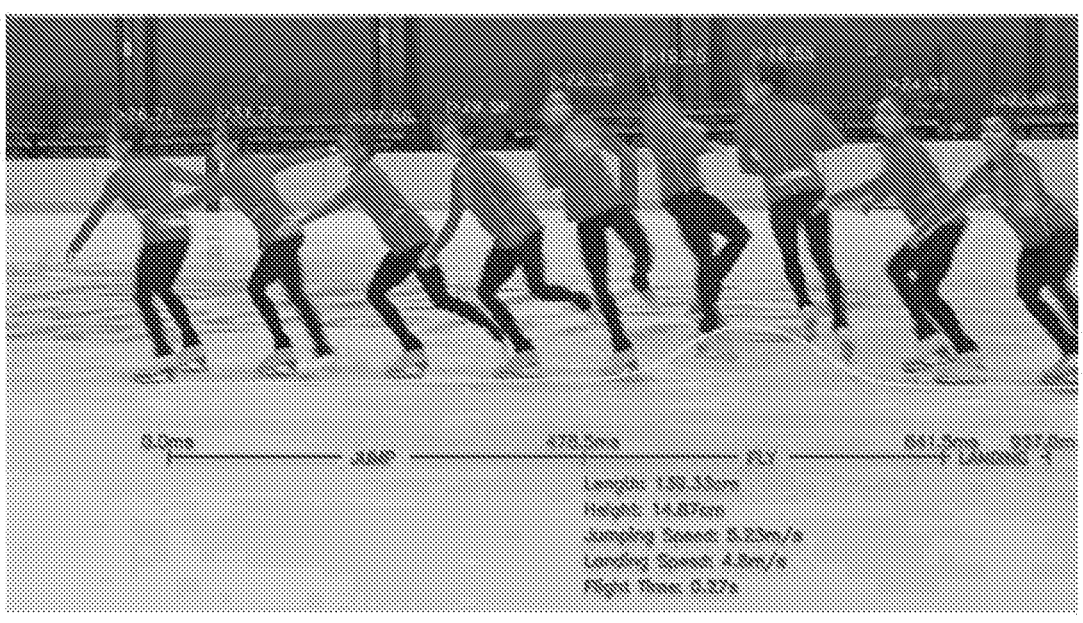
FIG. 4 is an image showing an athlete in motion with attribute key points and attribute analysis overlaying the image according to at least one of the implementations herein.
Figure 5:
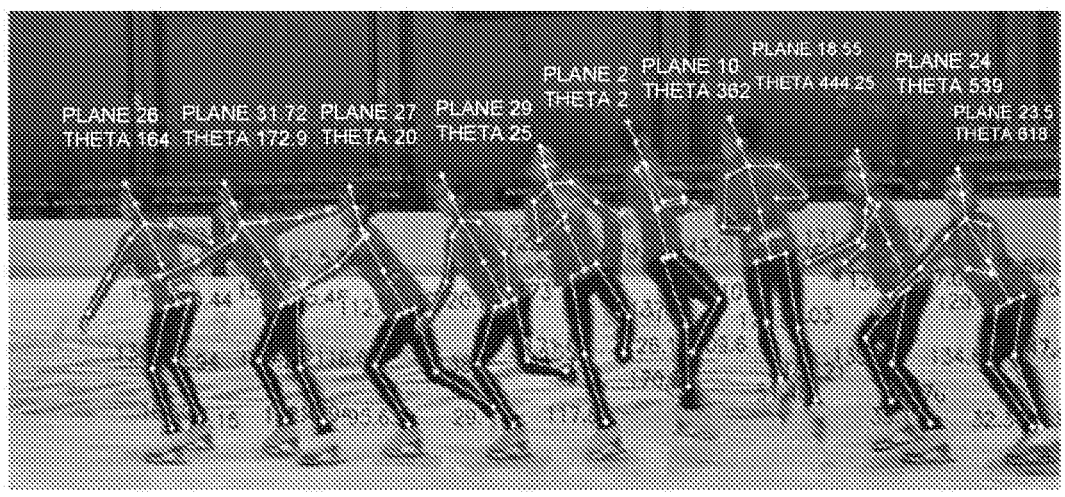
FIG. 5 is the same image as in FIG. 4 showing different attributes overlaying the image according to at least one of the implementations herein.

Referring to FIGS. 4-7, a visual depiction of the fine-grained attributes is provided. FIGS. 4-5 show a figure skater along a sequence of fused images placed side by side to show motion, and with fine-grained motion attributes for a single flick jump as the action. On FIG. 4, the attributes of jump length, fly length, landing length, total jump length, jump height, jumping speed, landing speed, and flight time are shown below the athlete. The vertical angle of the athlete's body relative to vertical is shown on and above the athlete. On FIG. 5, the vertical angle is shown as a plane angle, and a theta angle is the average angle over body joint-angles of an athlete. Other angles are shown on the athlete's body and extend between adjacent lines along limbs or body parts and from the same joint or body point. FIGS. 6-7 show the same fine-grained motion attributes except here for a triple salchow jump as the action. Note that the number values shown on FIGS. 4-7 are for demonstration purposes only and some of the number values may not be realistic.

Process 300 may include "generate output for individual attributes", 318, and to output an attribute value for each attribute to form an attribute vector (att) for each frame (or image). Here, a lightweight regression model may be used to define and output fine-grained motion attributes. With accurate and detailed annotated actions, such as a figure skating action data, these fine-grained motion attributes can be directly regressed from detected and cropped human body regions by an extremely "lightweight" model at least partly based on the HBONet neural network mentioned above. Lightweight here refers to low computational cost such that real-time rates are easier to achieve.

For the attribute value generating regression model, let $R_{att}$ be a regression network with parameters $\theta_{att}$ that may be trained on a target activity (or sport such as figure skating) action dataset D(X,Y) as described above. Then, the regression model $R_{att}$ is learned via minimizing the following error function:

$$\arg\min_{\theta_{att}} \|Y - R_{att}(\theta_{att}, X)\| \tag{1}$$

US 12,579,843 B2

11

Thereafter, the pre-trained regression model $R_{att}$ predicts or outputs a sequence of fine-grained motion attribute value vectors denoted as att={att$_1$, att$_2$, . . . , att$_T$}. Each attribute output node has a value even when indicating no action has occurred (or more specifically no sufficient action that is to be tracked has occurred).

Process 300 may include "generate action prediction values depending on fine-grained attributes", 320. The attribute vector outputs of the regression model are real values showing the amplitudes of estimated attributes, and here skating attributes for the current example. The FMAP agent 110 provides the attribute values to an agent action prediction network (or just agent network or relevance network or discriminative network) 122 of a sparse discriminative frame sampling unit or module 120.

In more detail, and as mentioned above, in figure skating and other sports, the most important and/or entertaining athletic action may often occur sparsely across an entire video of the athlete. In other words, different frames in a video sequence of the athlete will have different levels of relevance to the actions that are of interest, such as the jumps during a video of a figure skating routine. Thus, an agent network can be used to select sufficiently relevant samples and drop irrelevant samples so that only the relevant samples are used for final action recognition or other subsequent action-related processing, which both increases efficiency since irrelevant frames are not analyzed and increases accuracy by concentrating the input dataset (the probabilities for subsequent processing) on the relevant frames.

The selection of samples is at least partly based on the fine-grained motion attributes which are effectively domain-specific knowledge cues. In detail, process 300 may include "use neural network", 322, which refers to the agent action prediction network (or agent network $f_{agent}$, 122. The agent network 122 can receive states as input for each frame in order to output action probabilities. Specifically, for a video frame $x_t$, a state $s_t$=[des$_t$ sc$_t$ att$_t$] is the input to the agent network $f_{agent}$ so that the network receives all three types of input (semantic neural feature vector (des), action score vector (sc), and predicted fine-grained motion attribute vector (att)).

To implement the agent network $f_{agent}$, the agent network may use a long short-term memory (LSTM) model as the policy agent to aggregate and relay information across neighboring video frames bidirectionally, which permits optimization conveniences such as fast convergence and good model accuracy. The LSTM is modified here by adopting the bottleneck HBOnet structure as cited above to process the input state feature s={s$_1$, s$_2$, . . . , s$_T$} and a hidden state h={h$_1$, h$_2$, . . . , h$_T$} within the LSTM. By on specific example, the LSTM $f_{agent}$ neural network has at least four layers including a bottleneck structure comprised of a Fully-Connected (FC) layer as a first layer which is responsible for reducing the feature dimension with a reduction ratio, by one example which is set at scale=5, a rectifier linear unit (ReLU) activation second layer as well as a third layer of another subsequent fully connected layer to recover the original feature dimension. The LSTM ends with a fourth layer that uses a sigmoid activation function predicting a probabilistic score for each frame and each action being detected. Thus, with Equation (2) below, frame-specific probabilistic output $p_t$ is obtained. Each $p_t$ characterizes an action (or non-action). Specifically, the probabilistic score for each action at each frame could be calculated using an activation function at the nodes of a last layer of the LSTM as:

12

$$p_t = \text{sigmoid}(w_1(\text{ReLU}(w_0 s_t))) \qquad (2)$$

where each hidden state $h_t$=ReLU($w_o s_t$), and $w_0$ and $w_1$ are the parameters (or weights) of two fully connected layers with weight values determined by training and experimentation. Particularly, the output $p_t$ of the agent network $f_{agent}$ is a vector of probabilities p where each probability p is a probability of a different one of the actions being detected, tracked, indexed, and/or analyzed, and by one form for all possible actions.

To perform the training of the agent network $f_{agent}$, annotated training videos are used for each action. For instance, training dataset X mentioned above may include 4000 video clips of the same length (e.g., 32 and/or 64 frames each), representing 40 actions with 100 video clips for each action. Different length videos could be used for different actions, and a long video may include several of the actions at different frame locations.

Process 300 also may include "adjust predictions using reinforcement weight adjustment", 324 and by using deep reinforcement learning. Specifically, in order to improve the accuracy of the agent network $f_{agent}$, reinforcement learning by using reward values during training of the network may increase the accuracy of the weights applied at the neural network similar to that disclosed by Williams, R. J., Simple statistical gradient-following algorithms for connectionist reinforcement learning, Machine Learning, 8(3-4):229-256, 1992. A reward (or pseudo reward) follows a common definition, whose function is to encourage the training process to move towards correct decisions on average but suppress wrong decisions. For example, at one specific training iteration, the reward values should be large when the currently learned agent network wrongly classifies data, but the reward values should be small when the currently learned agent network correctly classifies the data. So, in the next training iteration, the agent network will be updated to be more accurate.

The pseudo reward is designated $r_t$=μ($g_t$) where t is time or the frame number, where $g_t$ is a gradient of weights $w_t$ obtained in a current iteration, and the pseudo reward takes the form of:

$$g_t = \frac{\partial f_{agent}}{\partial w_t} \qquad (3)$$
$$r_t = \mu(g_t) = -\beta \times g_t \times w_t$$

where β is the weighting factor for the reward, which may be set by experimentation and here is set at 0.1 in this example, and $\partial$ is partial derivative.

Next, the FMAP agent learns a policy function P($w_t$|$s_t$; θ) with parameters θ by maximizing the expected reward in the reinforcement equation:

$$J(\theta) = \sum_{n,t} E_{P(w_t|\theta)}(r_t) \qquad (4)$$

where J( ) is the objective function or say loss function, n is the number of training frames, $E_P$( ) is the conditional expectation function. The reinforcement principle can be used to update θ then by obtaining an unbiased estimator of:

$$\nabla J(\theta) = \sum_{n,t} E_{P(w_t|\theta)}(\nabla_\theta \log P(w_t|s_t; \theta) \times r_t) \qquad (5)$$

so that the output $p_t$ are more accurate for the agent network $f_{agent}$ and as the stochastic gradient descent optimization.

Process 300 next may include "determine action and/or non-action", 325. Here, a sample decision unit 124 then may be used to determine whether the probability vector $p_t$ indicates a certain most likely action among all of the probabilities p in the probability vector $p_t$. This is accomplished, by one example, by comparing each probability p to a criteria such as an action threshold $\alpha$, as follows.

$$\begin{cases} \text{true,} & \text{if } p_t > \alpha \\ \text{false,} & \text{otherwise} \end{cases} \qquad (6)$$

By one example, threshold $\alpha=0.5$, and this can be determined by experimentation. If one or more probabilities p are greater than the threshold (found to be true), then the frame is considered a relevant (or closely related) sample to an action and is kept for further action analysis. The highest p is then considered the probability of the most likely action for video frame $x_t$. Otherwise, the frame will be discarded.

Accordingly, process 300 then may include the inquiry "sample selected?" 326. If the sample is selected as true, then process 300 may optionally include "form sequence segment action prediction" 328. This accumulates initial action scores (sc) over the selected samples and generates a single representative value such as an average, mode, high value, low value or other representative value for a segment of frames. This representative value then may be used to perform segment-wise action recognition 332 or other action-related processing by applying downstream task applications 330.

Alternatively, the segmenting can be omitted and downstream frame-wise action recognition or other action-related processing can be performed instead. The initial scores of the selected samples may be used immediately or may be stored for future use. The downstream task applications may perform final action recognition and indexing of the recognized actions in a database or library so that the actions can be found quickly or automatically when searching the video sequence for a particular action. Other applications may analyze the actions as indexed for scoring or review for the sport, and so forth.

In any of these examples, all action scores of all actions in the form of sc of a selected sample (or frame) may be provided to the downstream applications for their use, or the score from vector sc only of the action with the highest probability p may be provided to the downstream application as needed. By other alternatives, the probabilities p of each relevant frame are accessible for the action-related processing applications, or by another option, only the highest p of a relevant frame is provided, and the probabilities may be provided with, or instead of, the scores (or scores) of the vector sc. Many variations are contemplated.

Whether or not the sample was selected, process 300 may include the inquiry "last frame?" 334 to check to see if the end of the video sequence was analyzed. If not, process 300 may include "obtain next frame" 336, and the analysis loops back to operations 308 and 312 to continue the action classification for the next frame. Otherwise, the process ends.

Experimental Results

Experiments were conducted to compare the presently discloses system and method to conventional systems classifying FSD-10 datasets as identified above with the same 10 classes with the present system. The present action classification with the FMAP agent obtains 10.7% better absolute accuracy than the conventional FSD-10 dataset system. Also, consistently high accuracy is obtained where the number of actions was increased from 10 to 40. The disclosed system was found to run with at most about 500 frames per second on a GPU, allowing for easy deployment on diverse computing platforms.

The comparisons between the present system and other conventional action classification systems is shown on Table 1. All models were trained with the same settings. Again, the FmapAgent model shows significantly more accuracy than that of the counterpart models.

TABLE 1

| Results comparison on the FSD-10 dataset (including 10 figure skating actions). | |
| --- | --- |
| Method | Mean accuracy (%) |
| C3D-ResNet-50 | 64.94 |
| ST-GCN | 72.43 |
| TSN+ | 80.24 |
| SlowFast | 82.17 |
| KTSN | 82.59 |
| FMAP agent | 93.29 (+10.70 improvement) |

It will be appreciated that the processes 200 and 300 respectively explained with FIGS. 2 and 3A-3B do not necessarily have to be performed in the order shown, nor with all of the operations shown. It will be understood that some operations may be skipped or performed in different orders.

Also, any one or more of the operations of FIGS. 2 and 3A-3B may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 8:
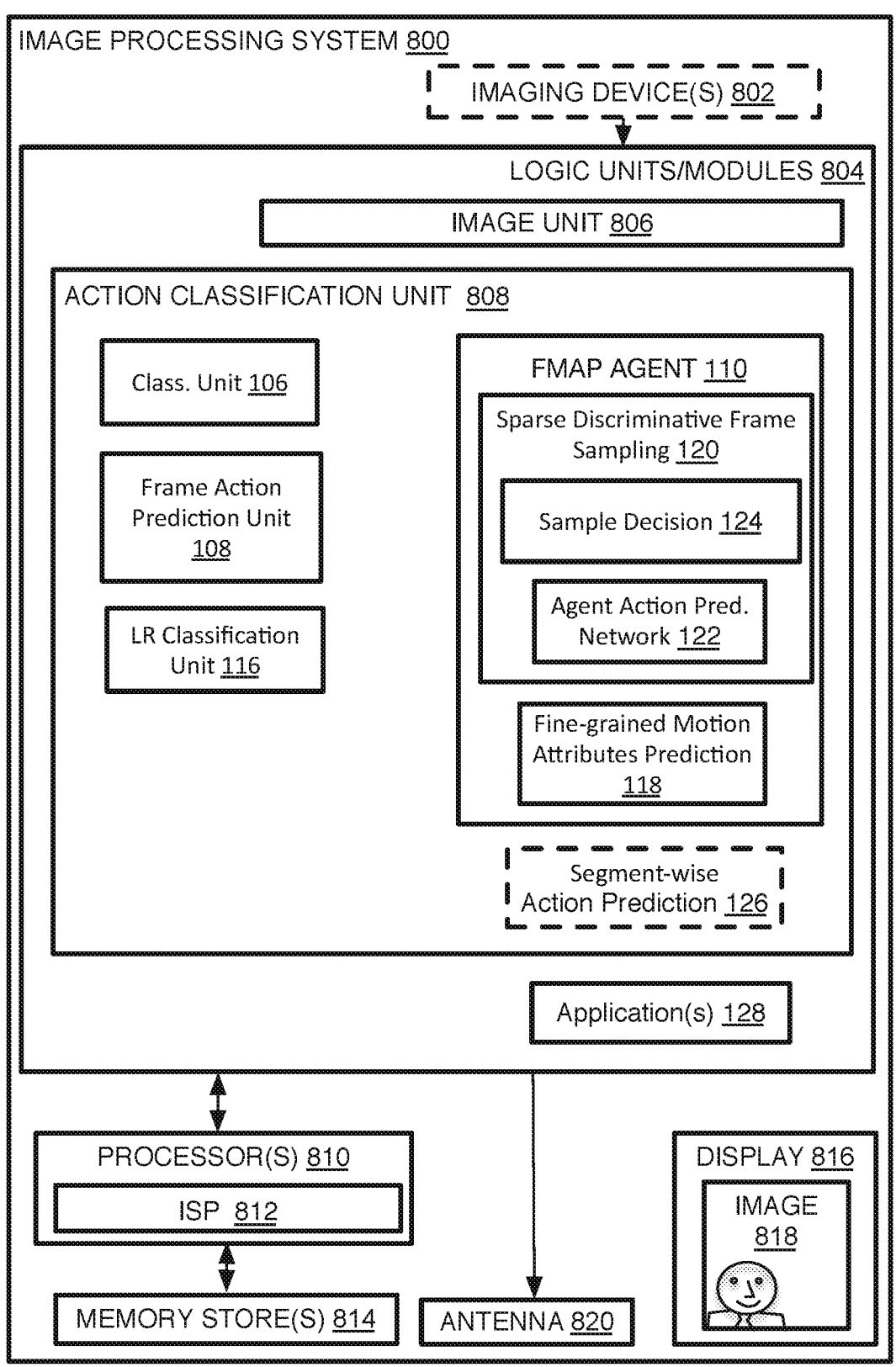
FIG. 8 is an illustrative diagram of an example system.

Referring to FIG. 8, an example image processing system 800 is arranged in accordance with at least some implementations of the present disclosure. In various implementations, the example image processing system 800 may have one or more imaging devices 802 to form or receive captured image data, and this may include either one or more cameras such as an array of cameras around an athletic field, stage or other such event location where the cameras should not be placed near athletic events or other types of objects in motion. Thus, in one form, the image processing system 800 may be a digital camera or other image capture device that is one of the cameras in an array of the cameras. In this case, the imaging device(s) 802 may be the camera hardware and camera sensor software, module, or component. In other examples, imaging processing system 800 may have an imaging device 802 that includes, or may be, one camera or some or all of the cameras in the array, and logic modules 804 may communicate remotely with, or otherwise may be communicatively coupled to, the imaging device 802 for further processing of the image data.

Accordingly, the part of the image processing system 800 that holds the logic units 804 and that processes the images may be on one of the cameras or may be on a separate device included in, or entirely forming, the image processing system 800. Thus, the image processing system 800 may be a desktop or laptop computer, remote server, or mobile computing device such as a smartphone, tablet, or other device. It also could be or have a fixed function device such as a set top box (cable box or satellite box), game box, or a television. The camera(s) 802 may be wirelessly communicating, or wired to communicate, image data to the logic units 804.

In any of these cases, such technology may include a camera such as a digital camera system, a dedicated camera device, web cam, or any other device with a camera, a still camera and so forth for the run-time of the system as well as for model learning and/or image collection for generating predetermined personal image data. The cameras may be RGB cameras or RGB-D cameras, but could be YUV cameras. Thus, in one form, imaging device 802 may include camera hardware and optics including one or more sensors as well as auto-focus, zoom, aperture, ND-filter, auto-exposure, flash, actuator controls, and so forth. By one form, the cameras may be fixed in certain degrees of freedom, or may be free to move in certain or all directions.

The logic modules 804 of the image processing system 800 may include, or communicate with, an image unit 806 that performs at least partial processing. Thus, the image unit 806 may perform pre-processing, decoding, encoding, and/or even post-processing to prepare the image data for transmission, storage, and/or display. It will be appreciated that the pre-processing performed by the image unit 806 could be modules located on one or each of the cameras, a separate image processing unit 800, or other location.

In the illustrated example, the logic modules 804 also may include an action classification unit 808 to provide action classifications of selected relevant samples (or frames) as described herein. The action classification unit 808 may include those units 106-110 and 116-126 already described with device 100 to perform action classification. One or more downstream applications 128 also may be provided to perform finale action recognition and/or to perform other tasks.

These units may be operated by, or even entirely or partially located at, processor(s) 810, such as the Intel Atom, and which may include a dedicated image signal processor (ISP) 812, to perform many of the operations mentioned herein. The logic modules 804 may be communicatively coupled to the components of the imaging device 802 in order to receive raw image data. The image processing system 800 also may have one or more memory stores 814 which may or may not hold the image data being analyzed, action classification code, and other apps, as well as other image data or logic units mentioned above, and antenna 820. In one example implementation, the image processing system 800 may have at least one processor 810 communicatively coupled to the display 816, and at least one memory 814 communicatively coupled to the processor to perform the operations described herein as explained above.

The image unit 806, which may have an encoder and decoder, and antenna 820 may be provided to compress and decompress the image date for transmission to and from other devices that may display or store the images. This may refer to transmission of image data among the cameras, and the logic units 804. Otherwise, the processed image 818 may be displayed on the display 816 or stored in memory 814 for further processing as described above. As illustrated, any of these components may be capable of communication with one another and/or communication with portions of logic modules 804 and/or imaging device 802. Thus, processors 810 may be communicatively coupled to both the image devices 802 and the logic modules 804 for operating those components. By one approach, although image processing system 800, as shown in FIG. 8, may include one particular set of unit or actions associated with particular components or modules, these units or actions may be associated with different components or modules than the particular component or module illustrated here.

Figure 9:
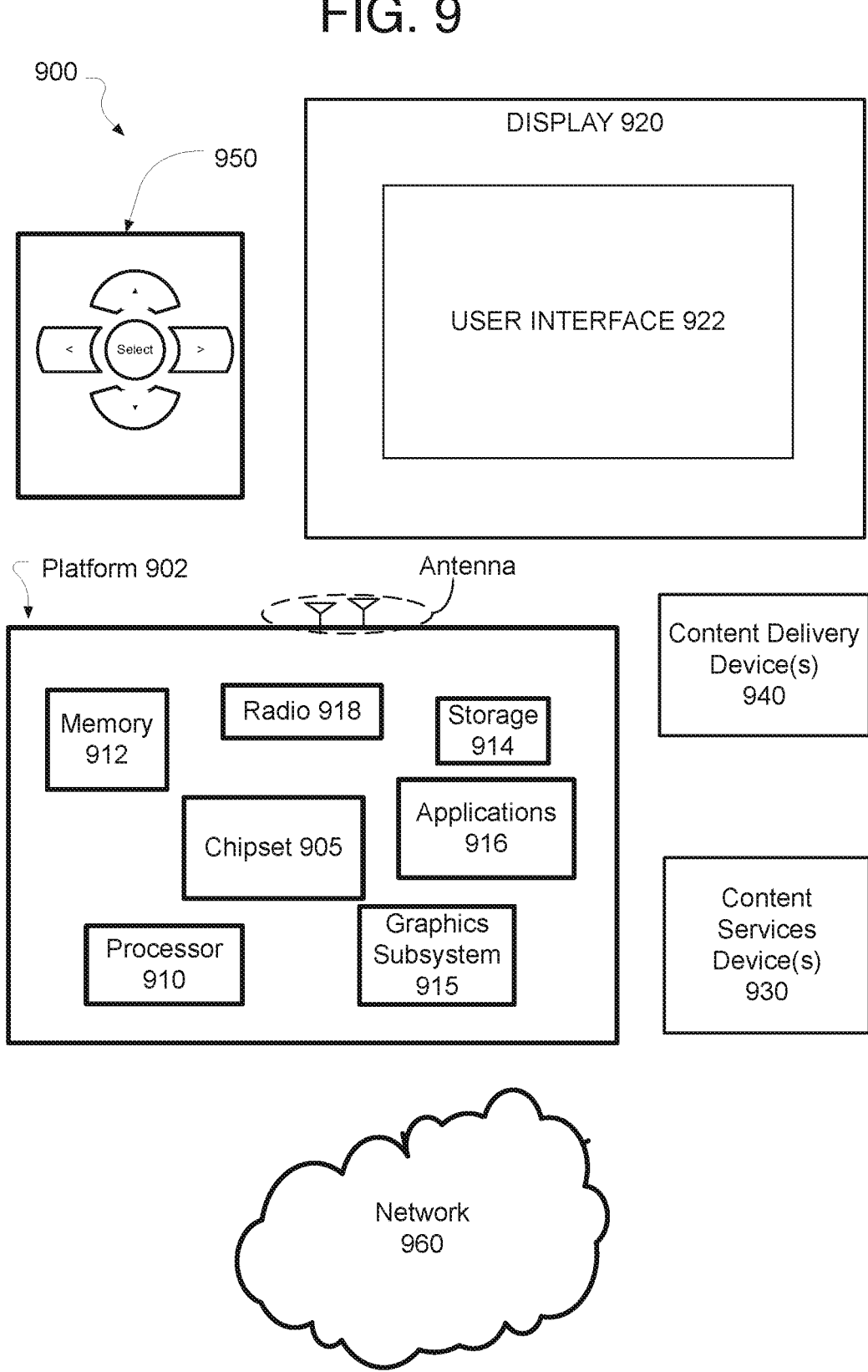
FIG. 9 is an illustrative diagram of another example system.

Referring to FIG. 9, an example system 900 in accordance with the present disclosure operates one or more aspects of the image processing system described herein. It will be understood from the nature of the system components described below that such components may be associated with, or used to operate, certain part or parts of the image processing systems described above including performance of a camera system operation described above. In various implementations, system 900 may be a media system although system 900 is not limited to this context. For example, system 900 may be incorporated into a digital video camera, mobile device with camera or video functions such as an imaging phone, web cam, personal computer (PC), remote server, laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 900 includes a platform 902 coupled to a display 920. Platform 902 may receive content from a content device such as content services device(s) 930 or content delivery device(s) 940 or other similar content sources. A navigation controller 950 including one or more navigation features may be used to interact with, for example, platform 902 and/or display 920. Each of these components is described in greater detail below.

In various implementations, platform 902 may include any combination of a chipset 905, processor 910, memory 912, storage 914, graphics subsystem 915, applications 916 and/or radio 918. Chipset 905 may provide intercommunication among processor 910, memory 912, storage 914, graphics subsystem 915, applications 916 and/or radio 918. For example, chipset 905 may include a storage adapter (not depicted) capable of providing intercommunication with storage 914.

Processor 910 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 910 may be dual-core processor(s), dual-core mobile processor(s), and so forth.

Memory 912 may be implemented as a volatile memory device such as, but not limited to, a Random Access Memory (RAM), Dynamic Random Access Memory (DRAM), or Static RAM (SRAM).

Storage 914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 914 may include technology to increase the storage performance enhanced protection for valuable digital media when multiple hard drives are included, for example.

Graphics subsystem 915 may perform processing of images such as still or video for display. Graphics subsystem 915 may be a graphics processing unit (GPU) or a visual processing unit (VPU), for example, and may or may not include an image signal processor (ISP). An analog or digital interface may be used to communicatively couple graphics subsystem 915 and display 920. For example, the interface may be any of a High-Definition Multimedia Interface, Display Port, wireless HDMI, and/or wireless HD compliant techniques. Graphics subsystem 915 may be integrated into processor 910 or chipset 905. In some implementations, graphics subsystem 915 may be a stand-alone card communicatively coupled to chipset 905.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In various implementations, display 920 may include any television type monitor or display. Display 920 may include, for example, a computer display screen, touch screen display, video monitor, television-like device, and/or a television. Display 920 may be digital and/or analog. In various implementations, display 920 may be a holographic display. Also, display 920 may be a transparent surface that may receive a visual projection. Such projections may convey various forms of information, images, and/or objects. For example, such projections may be a visual overlay for a mobile augmented reality (MAR) application. Under the control of one or more software applications 916, platform 902 may display user interface 922 on display 920.

In various implementations, content services device(s) 930 may be hosted by any national, international and/or independent service and thus accessible to platform 902 via the Internet, for example. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920.

In various implementations, content services device(s) 930 may include a cable television box, personal computer, network, telephone, Internet enabled devices or appliance capable of delivering digital information and/or content, and any other similar device capable of unidirectionally or bidirectionally communicating content between content providers and platform 902 and/display 920, via network 960 or directly. It will be appreciated that the content may be communicated unidirectionally and/or bidirectionally to and from any one of the components in system 900 and a content provider via network 960. Examples of content may include any media information including, for example, video, music, medical and gaming information, and so forth.

Content services device(s) 930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 902 may receive control signals from navigation controller 950 having one or more navigation features. The navigation features of controller 950 may be used to interact with user interface 922, for example. In implementations, navigation controller 950 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 950 may be replicated on a display (e.g., display 920) by movements of a pointer, cursor, focus ring, or other visual indicators displayed on the display. For example, under the control of software applications 916, the navigation features located on navigation controller 950 may be mapped to virtual navigation features displayed on user interface 922, for example. In implementations, controller 950 may not be a separate component but may be integrated into platform 902 and/or display 920. The present disclosure, however, is not limited to the elements or in the context shown or described herein.

In various implementations, drivers (not shown) may include technology to enable users to instantly turn on and off platform 902 like a television with the touch of a button after initial boot-up, when enabled, for example. Program logic may allow platform 902 to stream content to media adaptors or other content services device(s) 930 or content delivery device(s) 940 even when the platform is turned "off." In addition, chipset 905 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various implementations, platform 902 and display 920 may be an integrated unit. Display 920 and content service device(s) 930 may be integrated, or display 920 and content delivery device(s) 940 may be integrated, for example. These examples are not meant to limit the present disclosure.

In various implementations, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1900 may include components and interfaces suitable for communicating over wired communications media, such as input/output (I/O) adapters, physical connectors to connect the I/O adapter with a corresponding wired communications medium, a network interface card (MC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 9.

Figure 10:
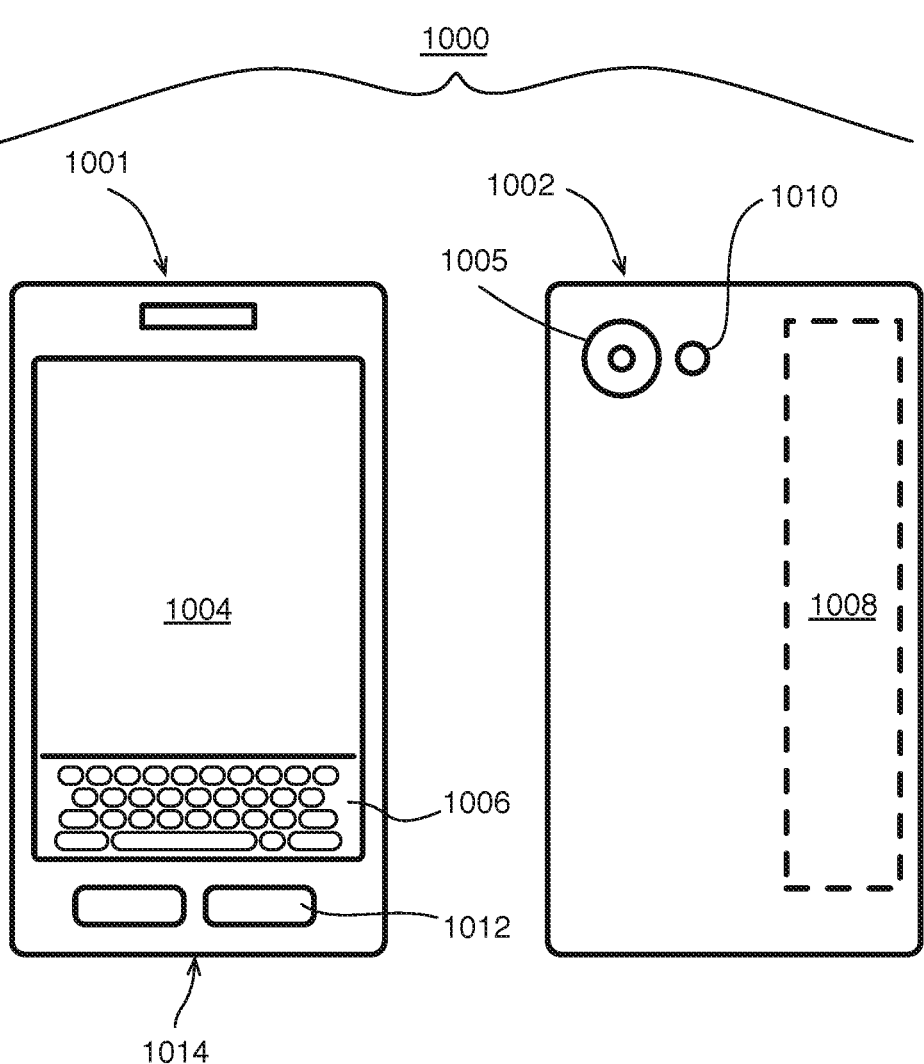
FIG. 10 illustrates another example device, all arranged in accordance with at least some implementations of the present disclosure.

Referring to FIG. 10, a small form factor device 1000 is one example of the varying physical styles or form factors in which systems 800 or 900 may be embodied. By this approach, device 800 may be implemented as a mobile computing device 1000 having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 10, device 1000 may include a housing with a front 1001 and a back 1002. Device 1000 includes a display 1004, an input/output (I/O) device 1006, and an integrated antenna 1008. Device 1000 also may include navigation features 1012. I/O device 1006 may include any suitable I/O device for entering information into a mobile computing device. Examples for I/O device 1006 may include an alphanumeric keyboard, a numeric keypad, a touch pad, input keys, buttons, switches, microphones, speakers, voice recognition device and software, and so forth. Information also may be entered into device 1000 by way of microphone 1014, or may be digitized by a voice recognition device. As shown, device 1000 may include a camera 1005 (e.g., including at least one lens, aperture, and imaging sensor) and a flash 1010 integrated into back 1002 (or elsewhere) of device 1000. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By an example one or more first implementations, at least one non-transitory machine-readable medium comprises a plurality of instructions that in response to being executed on a computing device, causes the computing device to operate by: obtaining image data of frames of a video sequence with content showing at least one person in motion; determining action attribute values each as an output of a same neural network receiving input data associated with the image data, wherein different output attribute value combinations indicate different actions or none of the actions; and determining whether any of the actions are being performed by the at least one person in the content by using the attribute values.

By one or more second implementations, and further to the first implementation, wherein the actions are different named motions by an athlete performing a sport wherein the named motions are identified in relation to the sport.

By one or more third implementations, and further to the first or second implementation, wherein one or more of the attributes is a measure of the speed that a body part of the at least one person moves between at least two frames.

By one or more fourth implementations, and further to any of the first to third implementation, wherein one or more of the attributes are one or more positions of points on the at least one person relative to the position of at least one other point.

By one or more fifth implementations, and further to any of the first to fourth implementation, wherein one or more of the attributes represents an angle between body parts of the at least one person or between a body part and a reference line.

By one or more sixth implementations, and further to any of the first to fifth implementation, wherein the instructions cause the computing device to operate by using the attribute values as input to a prediction neural network that outputs the likelihoods of multiple actions.

By one or more seventh implementations, and further to any of the first to fifth implementation, wherein the instructions cause the computing device to operate by using the attribute values as input to a prediction neural network that outputs the likelihoods of multiple actions; and wherein the instructions cause the computing device to operate by determining whether to use a frame as being relevant to recognition of an action depending on the likelihoods.

By one or more eighth implementations, a computer-implemented system comprises at least one memory to store image data of frames of a video sequence with content showing at least one person in motion; and at least one processor communicatively coupled to the memory and being arranged to operate by: determining action attribute values each as an output of a same neural network receiving input data associated with the image data, wherein different output attribute value combinations of different output states indicate different actions or none of the actions, and determining whether any of the actions are being performed by the at least one person in the content by using the attribute values.

By one or more ninth implementations, and further to any of the eighth implementation, wherein the at least one processor is arranged to operate by using the image data to generate feature vectors, forming initial action prediction scores per frame by using the feature vectors, and using the attribute values to determine which frames to use to recognize the actions.

By one or more tenth implementations, and further to the eighth implementation, wherein the at least one processor is arranged to operate by using the image data to generate feature vectors, forming initial action prediction scores per frame by using the feature vectors, and using the attribute values to determine which frames to use to recognize the actions; and wherein the determining whether any of the actions are being performed comprises using a neural network that receives the feature vectors, initial scores, and the attribute values as input to generate likelihoods of which action is being performed.

By one or more eleventh implementations, and further to the eighth implementation, wherein the at least one processor is arranged to operate by using the image data to generate feature vectors, forming initial action prediction scores per frame by using the feature vectors, and using the attribute values to determine which frames to use to recognize the actions; and wherein the determining whether any of the actions are being performed comprises using a neural network that receives the feature vectors, initial scores, and the attribute values as input to generate likelihoods of which action is being performed; and wherein the attribute values are generated by using feature vectors formed by using a lower resolution version of the image data than the resolution of the image data used to form the feature vectors to form the initial scores.

By one or more twelfth implementations, and further to any of the eighth to eleventh implementations, wherein the determining whether any of the actions are being performed comprises comparing a likelihood of each action output from a neural network and for a frame to at least one criterion, and only using the frame for further action-related processing when at least one of the likelihoods passes the criterion.

By one or more thirteenth implementations, and further to any of the eighth to eleventh implementations, wherein the determining whether any of the actions are being performed comprises comparing a likelihood of each action output from a neural network and for a frame to at least one criterion, and only using the frame for further action-related processing when at least one of the likelihoods passes the criterion; and wherein the at least one processor being arranged to discontinue use of a frame with no likelihoods meet the at least one criterion.

By one or more fourteenth implementations, at least one non-transitory machine-readable medium comprises a plurality of instructions that in response to being executed on a computing device, causes the computing device to operate by: obtaining image data of frames of a video sequence with content showing at least one person in motion; determining an action prediction initial score of individual frames of the video sequence; determining action attribute values each as an output of a same neural network receiving input data associated with the image data, wherein different output attribute value combinations indicate different actions or none of the actions; using the action attribute values to determine which frames of the video sequence are relevant frames that indicate an action is occurring; and providing the initial scores only of the relevant frames to perform further action-related processing.

By one or more fifteenth implementations, and further to the fourteenth implementation, wherein the instructions cause the computing device to operate by:

inputting the action attribute values, the initial scores, and feature vectors used to form the initial scores and of a single frame into an agent neural network that generates a probability an individual action is occurring in the frame, wherein the single frame is designated a relevant frame when at least one probability of the frame meets at least one criterion.

By one or more sixteenth implementations, and further to the fifteenth implementation, wherein the instructions cause the computing device to operate by: inputting the action attribute values, the initial scores, and feature vectors used to form the initial scores and of a single frame into an agent neural network that generates a probability an individual action is occurring in the frame, wherein the single frame is designated a relevant frame when at least one probability of the frame meets at least one criterion; and wherein the agent neural network is a long short-term memory (LSTM) neural network with at least a first layer that is a fully connected layer, subsequently a second layer that is a rectifier linear unit (ReLU) layer, a third layer that is a fully connected layer, and a fourth layer that uses a sigmoid activation function to form the probabilities.

By one or more seventeenth implementations, and further to the fifteenth implementation, wherein the instructions cause the computing device to operate by: inputting the action attribute values, the initial scores, and feature vectors used to form the initial scores and of a single frame into an agent neural network that generates a probability an individual action is occurring in the frame, wherein the single frame is designated a relevant frame when at least one probability of the frame meets at least one criterion; and wherein feature vectors used to form the action attribute values are based on image data with a lower resolution than the resolution of the image data used to form the feature vectors used to form the initial scores.

By one or more eighteenth implementations, and further to the fifteenth implementation, wherein the instructions cause the computing device to operate by: inputting the action attribute values, the initial scores, and feature vectors used to form the initial scores and of a single frame into an agent neural network that generates a probability an individual action is occurring in the frame, wherein the single frame is designated a relevant frame when at least one probability of the frame meets at least one criterion; and wherein the instructions cause the computing device to operate by providing access to all of the probabilities of a relevant frame and for applications performing the action-related processing.

By one or more nineteenth implementations, and further to the fifteenth implementation, wherein the instructions cause the computing device to operate by: inputting the action attribute values, the initial scores, and feature vectors used to form the initial scores and of a single frame into an agent neural network that generates a probability an individual action is occurring in the frame, wherein the single frame is designated a relevant frame when at least one probability of the frame meets at least one criterion; and wherein the instructions cause the computing device to operate by providing only the highest probability of an action among all of the probabilities of a relevant frame to applications performing the action-related processing.

By one or more twentieth implementations, a method of image processing comprises obtaining image data of frames of a video sequence with content showing at least one person in motion; determining an action prediction initial score of individual frames of the video sequence based on image data of a first resolution; determining action attribute values each as an output of a same neural network receiving input data associated with a version of the image data in a second resolution different than the first resolution, wherein different output attribute value combinations indicate different actions or none of the actions; and using the action attribute values to determine which of the frames are relevant to an action and should be provided for further action-related processing.

By one or more twenty-first implementations, and further to the twentieth implementation, wherein the method comprising inputting the action attribute values of a single frame into an agent neural network that outputs probabilities, wherein each probability is of a different action, wherein the single frame is designated a relevant frame when at least one probability of the frame meets at least one criterion.

By one or more twenty-second implementations, and further to the twentieth implementation, wherein the method comprising inputting the action attribute values of a single frame into an agent neural network that outputs probabilities, wherein each probability is of a different action, wherein the single frame is designated a relevant frame when at least one probability of the frame meets at least one criterion; and wherein a plurality of initial scores of the same action and of multiple frames forming a segment of the video sequence are combined to form a single representative action score to be provided for the further action-related processing.

By one or more twenty-third implementations, and further to the twentieth implementation, wherein the method comprising inputting the action attribute values of a single frame into an agent neural network that outputs probabilities, wherein each probability is of a different action, wherein the single frame is designated a relevant frame when at least one probability of the frame meets at least one criterion; and wherein a plurality of initial scores of the same action and of multiple frames forming a segment of the video sequence are combined to form a single representative action score to be provided for the further action-related processing; and wherein a plurality of the probabilities of the same action and of multiple frames forming a segment of the video sequence are combined to form a single representative probability to be provided for the further action-related processing.

In one or more twenty-fourth implementations, and further to any one of the twentieth to twenty-third implementations, wherein one or more of the attributes is a measure of the speed that a body part of the at least one person moves between at least two frames.

In one or more twenty-fifth implementations, and further to any one of the twentieth to twenty-fourth implementations, wherein one or more of the attributes represents an angle between body parts of the at least one person or between a body part and a reference line.

In one or more twenty-sixth implementations, a device or system includes a memory and a processor to perform a method according to any one of the above implementations.

In one or more twenty-seventh implementations, at least one machine readable medium includes a plurality of instructions that in response to being executed on a computing device, cause the computing device to perform a method according to any one of the above implementations.

In one or more twenty-eighth implementations, an apparatus may include means for performing a method according to any one of the above implementations.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. At least one non-transitory machine-readable medium comprising a plurality of instructions to cause at least one programmable circuit to at least:

determine scores based on image data of frames of a video sequence;

determine action attribute values as an output of a neural network based on input data associated with a lower resolution version of the image data, wherein respective different combinations of the action attribute values represent one of corresponding different actions associated with the image data or non-action associated with the image data; and determine whether any of the different actions are associated with the image data based on the scores and the action attribute values.

2. The medium of claim 1, wherein the actions correspond to motions associated with a sport.

3. The medium of claim 1, wherein one or more of the action attribute values are a measure of a speed that a body part moves between at least two of the frames.

4. The medium of claim 1, wherein one or more of the action attribute values are one or more positions of points on at least one person relative to a position of at least one other point on the at least one person.

5. The medium of claim 1, wherein one or more of the action attribute values represent an angle between body parts of at least one person or an angle between a body part and a reference line.

6. The medium of claim 1, wherein the neural network includes a prediction neural network that outputs likelihoods of multiple actions.

7. The medium of claim 6, wherein the instructions are to cause one or more of the at least one programmable circuit to determine whether to use a first one of the frames for action recognition based on the likelihoods.

8. A computer-implemented system comprising:

at least one memory to store image data of frames of a video sequence;

instructions; and at least one processor circuit to be programmed based on the instructions to:

determine initial scores based on first feature vectors, the first feature vectors based on the image data;

determine action attribute values as an output of a neural network based on input data, the input data including second features vectors based on a lower resolution version of the image data, wherein respective different combinations of the action attribute values represent one of corresponding different actions associated with the image data or non-action associated with the image data; and determine whether any of the actions are associated with the image data based on the initial scores and the action attribute values.

9. The system of claim 8, wherein one or more of the at least one processor circuit is to use the action attribute values to determine which frames to use for action recognition.

10. The system of claim 9, wherein one or more of the at least one processor circuit is to determine whether any of the actions are associated with the image data based on a second neural network, the second neural network to process the first feature vectors, the initial scores, and the action attribute values as input to generate likelihoods of which one of the actions are associated with the image data.

11. The system of claim 8, wherein one or more of the at least one processor circuit is to:

compare likelihoods of respective ones of the actions output from a second neural network for a first one of the frames to at least one criterion; and use the first one of the frames for action-related processing based on at least one of the likelihoods passing the at least one criterion.

12. The system of claim 11, wherein one or more of the at least one processor circuit is to discontinue use of a second frame associated with no likelihoods that meet the at least one criterion.

13. At least one non-transitory machine-readable medium comprising a plurality of instructions to cause at least one programmable circuit to at least:

determine action prediction initial scores of individual frames of a video sequence based on feature vectors associated with respective ones of the individual frames;

determine action attribute values as an output of a first neural network based on input data associated with image data of the individual frames, wherein respective different combinations of the action attribute values represent one of corresponding different actions associated with the image data or non-action associated with the image data;

input ones of the action attribute values, ones of the action prediction initial scores and ones of the feature vectors for a first one of the frames to a second neural network to obtain probabilities of individual actions associated with the first one of the frames;

determine whether the first one of the frames is a relevant frame that indicates an action occurrence based on at least one of the probabilities meeting at least one criterion;

discard at least some of the ones of the action prediction initial scores based on the first one of the frames not being determined to be the relevant frame; and output at least some of the ones of the action prediction initial scores based on the first one of the frames being determined to be the relevant frame.

14. The medium of claim 13, wherein the second neural network is a long short-term memory (LSTM) neural network including a first layer that is a fully connected layer, a second layer that is a rectifier linear unit (ReLU) layer, a third layer that is a fully connected layer, and a fourth layer that uses a sigmoid activation function to form the probabilities.

15. The medium of claim 13, wherein the feature vectors are first feature vectors, the input data is based on second feature vectors, and the instructions are to cause one or more of the at least one programmable circuit to generate the second feature vectors based on a lower resolution version of the image data.

16. The medium of claim 13, wherein the instructions are to cause one or more of the at least one programmable circuit to output the probabilities of the first one of the frames based on the first one of the frames being determined to be the relevant frame.

17. The medium of claim 13, wherein the instructions are to cause one or more of the at least one programmable circuit to output a highest probability among the probabilities of the first one of the frames based on the first one of the frames being determined to be the relevant frame.

18. A method comprising:

determining action prediction initial scores of individual frames of a video sequence based on image data of frames of the video sequence, the image data of a first resolution;

determining action attribute values as an output of a neural network based on input data associated with a version of the image data having a second resolution different than the first resolution, wherein respective different combinations of the action attribute values represent one of corresponding different actions associated with the image data or non-action associated with the image data; and combining ones of the action prediction initial scores of a same action and of multiple frames forming a segment of the video sequence to determine a single representative action score to output for further action-related processing.

19. The method of claim 18, including:

inputting the action attribute values of a single frame into a second neural network that outputs probabilities corresponding respectively to different actions; and designating one of the frames to be a relevant frame based on at least one probability of the one of the frames meeting at least one criterion.

20. The method of claim 19, including combining ones of the probabilities of the same action and of the multiple frames forming the segment of the video sequence to determine a single representative probability to output for the further action-related processing.

21. The method of claim 18, wherein one or more of the attributes is a measure of a speed that a body part moves between at least two of the frames.

22. The method of claim 18, wherein one or more of the action attribute values represent an angle between body parts of at least one person or an angle between a body part and a reference line.

* * * * *